United States Patent
Sudo et al.

(10) Patent No.: US 12,218,437 B2
(45) Date of Patent: Feb. 4, 2025

(54) ANTENNA MODULE AND COMMUNICATION APPARATUS EQUIPPED WITH THE SAME

(71) Applicant: Murata Manufacturing Co., Ltd., Kyoto (JP)

(72) Inventors: Kaoru Sudo, Kyoto (JP); Kengo Onaka, Kyoto (JP); Hirotsugu Mori, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 737 days.

(21) Appl. No.: 17/191,889

(22) Filed: Mar. 4, 2021

(65) Prior Publication Data

US 2021/0194126 A1    Jun. 24, 2021

Related U.S. Application Data

(63) Continuation of application No. 17/029,224, filed on Sep. 23, 2020, now Pat. No. 10,998,630, which is a
(Continued)

(30) Foreign Application Priority Data

Mar. 30, 2018  (JP) .................. 2018-070045

(51) Int. Cl.
*H01Q 5/335* (2015.01)
*H01Q 1/24* (2006.01)
(Continued)

(52) U.S. Cl.
CPC ............. *H01Q 5/335* (2015.01); *H01Q 1/243* (2013.01); *H01Q 9/0421* (2013.01); *H01Q 21/065* (2013.01); *H04B 1/0064* (2013.01)

(58) Field of Classification Search
CPC ...... H01Q 5/335; H01Q 1/243; H01Q 9/0421; H01Q 21/065; H01Q 9/045; H04B 1/0064; H04B 1/0053; H04B 1/0458; H04B 1/18
See application file for complete search history.

(56) References Cited

U.S. PATENT DOCUMENTS

| | | | |
|---|---|---|---|
| 5,874,919 A | 2/1999 | Rawnick et al. | |
| 7,295,814 B2 * | 11/2007 | Yamashita | H04B 1/0057 333/132 |

(Continued)

FOREIGN PATENT DOCUMENTS

| | | |
|---|---|---|
| CN | 201611688 U | 10/2010 |
| CN | 106486775 A | 3/2017 |

(Continued)

OTHER PUBLICATIONS

International Search report for PCT/JP2019/011064 dated May 21, 2019.
(Continued)

*Primary Examiner* — Ankur Jain
(74) *Attorney, Agent, or Firm* — McDonald Hopkins LLC

(57) ABSTRACT

An antenna module includes a dielectric substrate having a multilayer structure, a power supply element and a ground electrode (GND) disposed in or on the dielectric substrate, a parasitic element, a power supply wiring line, and first and second stubs to be connected to the power supply wiring line. The parasitic element is disposed in a layer between the power supply element and the ground electrode (GND). The power supply wiring line passes through the parasitic element and supplies radio frequency power to the power supply element. The first stub is connected to a position different from a connection position of the second stub in the power supply wiring line.

18 Claims, 5 Drawing Sheets

Related U.S. Application Data continuation of application No. PCT/JP2019/011064, filed on Mar. 18, 2019.

(51) Int. Cl.
*H01Q 9/04* (2006.01)
*H01Q 21/06* (2006.01)
*H04B 1/00* (2006.01)

(56) References Cited

U.S. PATENT DOCUMENTS

| | | | | |
|---|---|---|---|---|
| 7,330,158 | B2* | 2/2008 | Harihara | G06K 19/07786 |
| | | | | 343/700 MS |
| 8,803,315 | B2* | 8/2014 | Takizawa | H01L 23/66 |
| | | | | 257/778 |
| 9,660,340 | B2* | 5/2017 | Yokoyama | H01Q 5/321 |
| 9,692,099 | B2* | 6/2017 | Kato | H01Q 1/24 |
| 9,865,928 | B2* | 1/2018 | Sudo | H01Q 1/38 |
| 10,305,184 | B2* | 5/2019 | Ishizuka | H01Q 1/243 |
| 2002/0145569 | A1* | 10/2002 | Onaka | H01Q 1/2283 |
| | | | | 343/702 |
| 2018/0151955 | A1* | 5/2018 | Zhang | H01Q 5/371 |

FOREIGN PATENT DOCUMENTS

| | | |
|---|---|---|
| JP | H11-340710 A | 12/1999 |
| JP | 2002-271131 A | 9/2002 |
| JP | 2002-314330 A | 10/2002 |
| JP | 2005-286854 A | 10/2005 |

OTHER PUBLICATIONS

Written Opinion for PCT/JP2019/011064 dated May 21, 2019.
Chinese Office action for 201980022692.0 dated Jan. 14, 2021.

* cited by examiner

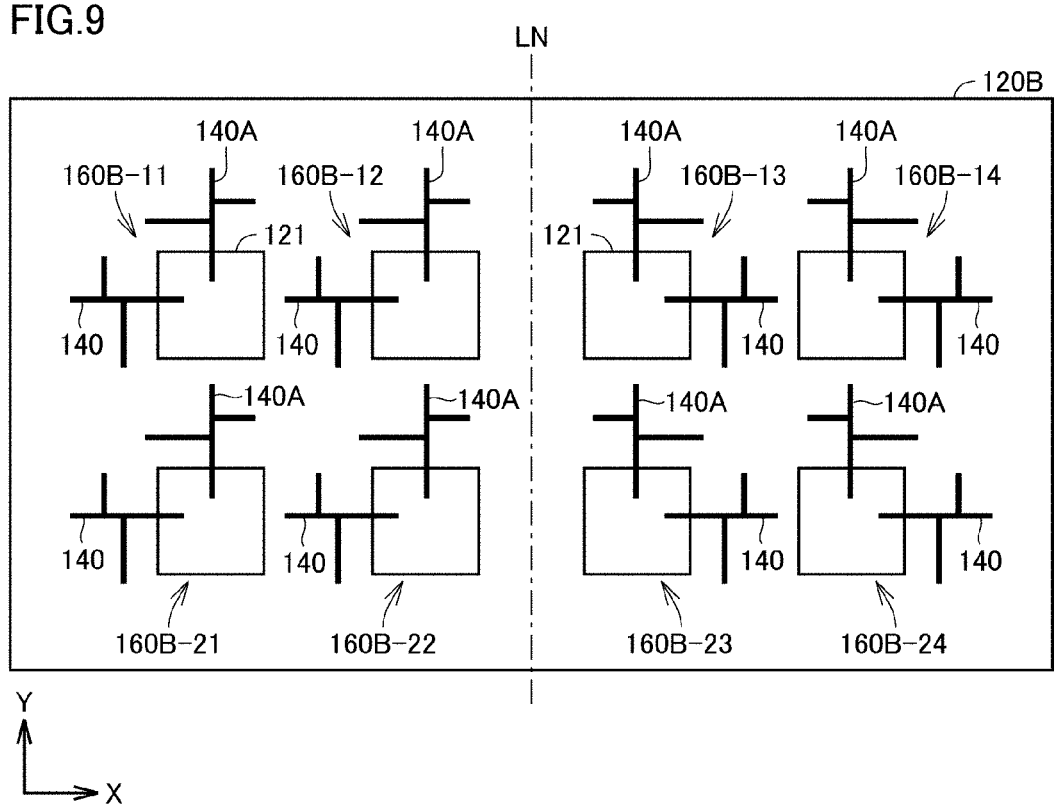
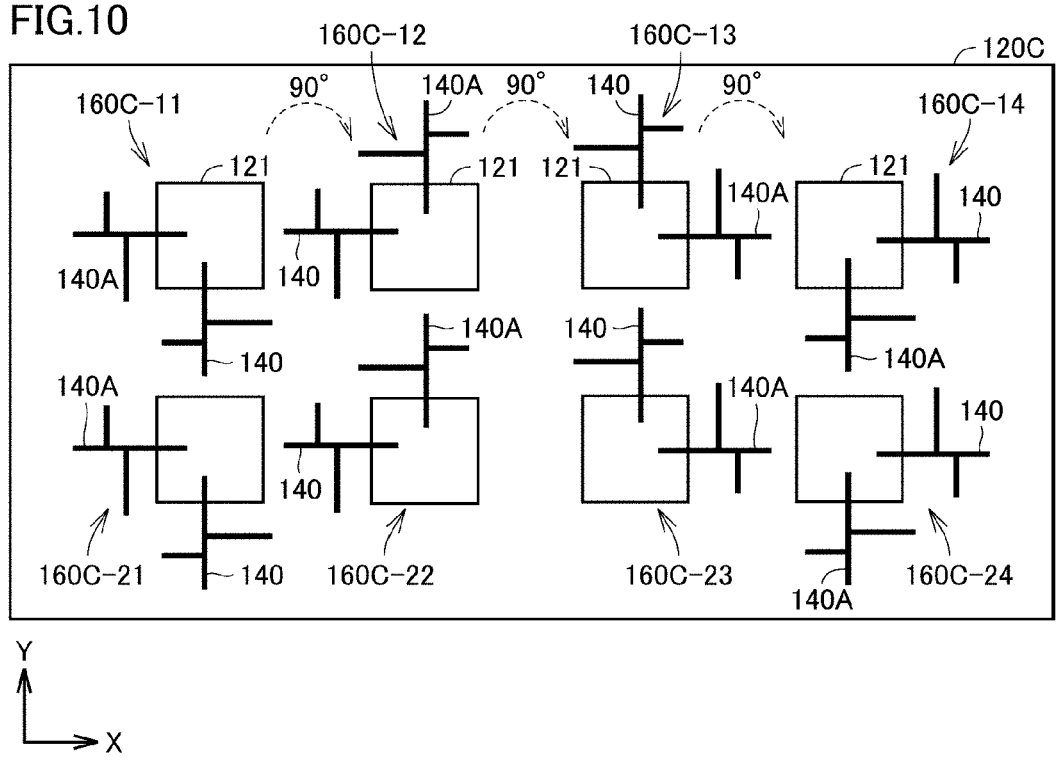

ANTENNA MODULE AND COMMUNICATION APPARATUS EQUIPPED WITH THE SAME

This is a continuation of U.S. Application Ser. No. 17/029,224 filed on Sep. 23, 2020 which is a continuation of International Application No. PCT/JP2019/011064 filed on Mar. 18, 2019 which claims priority from Japanese Patent Application No. 2018-070045 filed on Mar. 30, 2018. The contents of these applications are incorporated herein by reference in their entireties.

BACKGROUND

Technical Field

The present disclosure relates to an antenna module and a communication apparatus equipped with the antenna module, and more particularly, to an impedance matching technique of an antenna module operating at a plurality of frequencies.

A technology in which a stub is provided on a transmission line for supplying radio frequency power to an antenna element to widen a frequency range of the antenna, has been well-known.

Japanese Unexamined Patent Application Publication No. 2002-271131 (Patent Document 1) discloses a configuration in which, by providing stubs of different shapes at substantially the same location on a transmission line of a patch antenna, a band width of a radio frequency signal that can be radiated by the patch antenna is widened.

Patent Document 1: Japanese Unexamined Patent Application Publication No. 2002-271131

BRIEF SUMMARY

In recent years, mobile terminals, such as smartphones have become popular, and in addition, electric household appliances, electronic devices, and the like having a wireless communication function have been increasing by technological innovations, such as IoT. This raises a concern that communication speeds and communication quality are lowered due to an increase in communication traffic of wireless networks.

As one of measures for solving such a problem, the fifth generation mobile communication system (5G) has been developed. In 5G, it is intended to achieve a large increase in communication speed and an improvement in communication quality by performing sophisticated beamforming and spatial multiplexing while using a large number of power supply elements, and by using, in addition to signals of 6-GHz band frequencies having been commonly used, signals of a millimeter wave band having higher frequencies (several tens of GHz).

In 5G, frequencies of a plurality of millimeter wave bands are used in some case, in which the frequency bands are separate from each other. In this case, it is suitable to transmit and receive signals of the plurality of frequency bands with one antenna.

A patch antenna disclosed in Patent Document 1 cited above is configured to match the impedance for a single frequency by using stubs, but does not consider matching the impedance for a plurality of frequency bands.

The present disclosure provides an antenna module able to appropriately match the impedance for a plurality of frequency bands.

An antenna module according to a certain aspect of the present disclosure includes a dielectric substrate having a multilayer structure, a power supply element and a ground electrode disposed in or on the dielectric substrate, a parasitic element disposed in a layer between the power supply element and the ground electrode, a first power supply wiring line, and a first stub and a second stub to be connected to the first power supply wiring line. The first power supply wiring line passes through the parasitic element, and supplies radio frequency power to the power supply element. The first stub is connected to a position different from a connection position of the second stub in the first power supply wiring line.

The first stub can be connected to the first power supply wiring line at a first position corresponding to a first frequency of a radio frequency signal radiated at the power supply element. The second stub can be connected to the first power supply wiring line at a second position corresponding to a second frequency of a radio frequency signal radiated at the parasitic element.

A distance from a connection position between the power supply element and the first power supply wiring line to the first position along the first power supply wiring line can be determined in accordance with the first frequency. A distance from a position where the first power supply wiring line passes through the parasitic element to the second position along the first power supply wiring line can be determined in accordance with the second frequency.

The first stub can have a line length corresponding to a wave length of a radio frequency signal radiated at the power supply element. The second stub can have a line length corresponding to a wave length of a radio frequency signal radiated at the parasitic element.

The antenna module can further include a power supply circuit mounted in or on the dielectric substrate and configured to supply radio frequency power to the power supply element.

The first stub and the second stub can be formed in a layer between the parasitic element and the ground electrode.

The first stub and the second stub can be formed in a layer between a mounting surface of the dielectric substrate and the ground electrode.

Each of the first stub and the second stub can be an open stub.

Each of the first stub and the second stub can be a short stub in which an end portion on an opposite side to an end portion connected to the first power supply wiring line is grounded.

The antenna module can further include a second power supply wiring line that passes through the parasitic element and supplies radio frequency power to the power supply element, and a third stub and a fourth stub to be connected to the second power supply wiring line. The third stub can be connected to a position different from a connection position of the fourth stub in the second power supply wiring line.

An antenna module according to another aspect of the present disclosure includes a dielectric substrate having a multilayer structure, a ground electrode disposed in or on the dielectric substrate, and a plurality of antennas including a first antenna and a second antenna. The first antenna and the second antenna are disposed adjacent to each other in the dielectric substrate. Each of the first antenna and the second antenna includes (i) a power supply element to be supplied with radio frequency power, (ii) a parasitic element disposed in a layer between the power supply element and the ground electrode, (iii) a first power supply wiring line and a second power supply wiring line that pass through the parasitic element and supply radio frequency power to the power supply element, (iv) a first stub and a second stub to be connected to the first power supply wiring line, and (v) a third stub and a fourth stub to be connected to the second power supply wiring line. The first stub is connected to a position different from a connection position of the second stub in the first power supply wiring line. The third stub is connected to a position different from a connection position of the fourth stub in the second power supply wiring line. Between the first antenna and the second antenna, there is formed at most one of the first power supply wiring line and the second power supply wiring line of any of the first antenna and the second antenna.

When the antenna module is seen in a plan view from a normal direction of the dielectric substrate, the first antenna can be disposed in a mode to be line-symmetrical to the second antenna.

When the antenna module is seen in a plan view from the normal direction of the dielectric substrate, the second antenna can be disposed adjacent to the first antenna in a mode of rotating the first antenna by 90 degrees.

An antenna module according to still another aspect of the present disclosure includes a dielectric substrate having a multilayer structure, a ground electrode disposed in or on the dielectric substrate, and a plurality of antennas. Each of the plurality of antennas includes (i) a power supply element to be supplied with radio frequency power, (ii) a parasitic element disposed in a layer between the power supply element and the ground electrode, (iii) a power supply wiring line that passes through the parasitic element and supplies radio frequency power to the power supply element, and (iv) two stubs connected at different positions along the power supply wiring line. The power supply wiring line and the stubs of each of the plurality of antennas do not overlap with the power supply wiring lines and the stubs of the other antennas when the antenna module is seen in a plan view.

A communication apparatus according to still another aspect of the present disclosure includes the antenna module according to any one of the above aspects.

In the antenna module of the present disclosure, the power supply element and the parasitic element are provided, and the power supply wiring line passes through the parasitic element and supplies radio frequency power to the power supply element. The first stub and the second stub are connected to different positions of the power supply wiring line. This makes it possible to appropriately match the impedance for a plurality of frequency bands.

BRIEF DESCRIPTION OF THE SEVERAL VIEWS OF THE DRAWINGS

FIG. 9 is a diagram illustrating a third arrangement example of antennas in an antenna array.

FIG. 10 is a diagram illustrating a fourth arrangement example of antennas in an antenna array.

DETAILED DESCRIPTION

Figure 1:
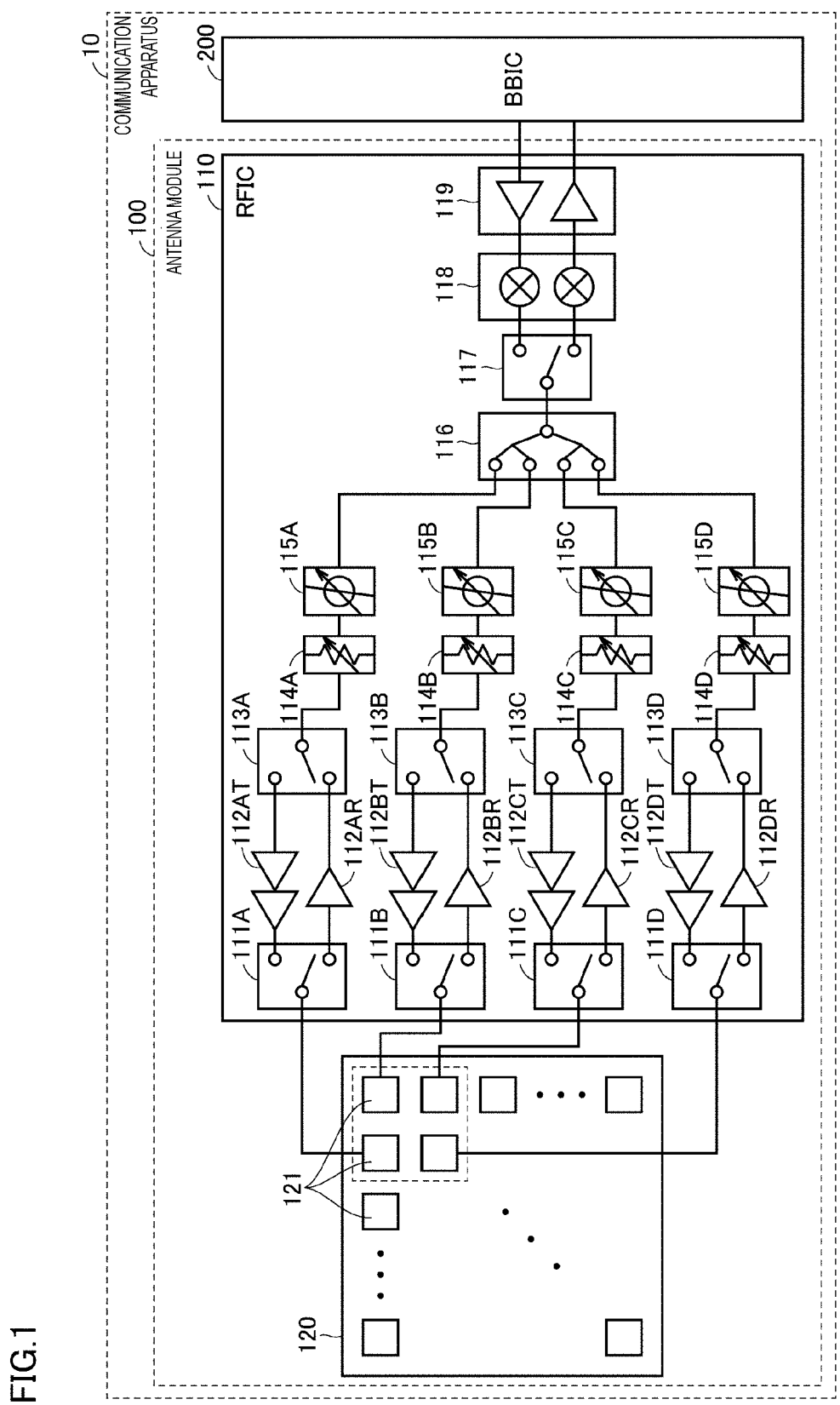
FIG. 1 is a block diagram of a communication apparatus to which an antenna module according to an embodiment is applied.

Hereinafter, an embodiment of the present disclosure will be described in detail with reference to the accompanying drawings. Note that the same or corresponding constituent elements in the drawings are denoted by the same reference signs, and the description thereof will not be repeated.

Basic Configuration of Communication Apparatus

FIG. 1 is a block diagram of an example of a communication apparatus 10 to which an antenna module 100 according to Embodiment 1 is applied. The communication apparatus 10 is, for example, a mobile terminal, such as a cellular phone, a smartphone or a tablet, or a personal computer having a communication function.

Referring to FIG. 1, the communication apparatus 10 includes the antenna module 100 and a BBIC 200 constituting a baseband signal processing circuit. The antenna module 100 includes an RFIC 110, which is an example of a power supply circuit, and an antenna array 120. The communication apparatus 10 up-converts a signal transmitted from the BBIC 200 to the antenna module 100 into a radio frequency signal and radiates the radio frequency signal from the antenna array 120, and down-converts a radio frequency signal received by the antenna array 120 and processes the down-converted signal in the BBIC 200.

In FIG. 1, for ease of description, among a plurality of power supply elements 121 included in the antenna array 120, only a configuration corresponding to four power supply elements 121 is illustrated, and a configuration corresponding to the other power supply elements 121 having the same configuration is omitted. In the present embodiment, a case where the power supply element 121 is a patch antenna having a rectangular flat plate shape will be described as an example.

The RFIC 110 includes switches 111A to 111D, 113A to 113D and 117, power amplifiers 112AT to 112DT, low-noise amplifiers 112AR to 112DR, attenuators 114A to 114D, phase shifters 115A to 115D, a signal synthesizer/demultiplexer 116, a mixer 118, and an amplification circuit 119.

When transmitting a radio frequency signal, the switches 111A to 111D and 113A to 113D are switched to the side of the power amplifiers 112AT to 112DT, and the switch 117 is connected to a transmission-side amplifier of the amplification circuit 119. When receiving a radio frequency signal, the switches 111A to 111D and 113A to 113D are switched to the side of the low-noise amplifiers 112AR to 112DR, and the switch 117 is connected to a reception-side amplifier of the amplification circuit 119.

A signal transmitted from the BBIC 200 is amplified by the amplification circuit 119, and then up-converted by the mixer 118. A transmission signal, which is an up-converted radio frequency signal, is demultiplexed by the signal synthesizer/demultiplexer 116 into four signal waves; the demultiplexed signal waves pass through four signal paths, and are supplied to different power supply elements 121, respectively. At this time, the directivity of the antenna array 120 may be adjusted by individually adjusting the phase shift degrees of the phase shifters 115A to 115D disposed in the respective signal paths.

Reception signals, each of which is a radio frequency signal received by each power supply element 121, respectively pass through four different signal paths, and are multiplexed by the signal synthesizer/demultiplexer 116. The multiplexed reception signal is down-converted by the mixer 118, amplified by the amplification circuit 119, and then transmitted to the BBIC 200.

The RFIC 110 is formed as, for example, a one-chip integrated circuit component including the above-described circuit configuration. Alternatively, the devices (switches, power amplifiers, low-noise amplifiers, attenuators, and phase shifters) in the RFIC 110 corresponding to the power supply elements 121 may be formed as a one-chip integrated circuit component for each corresponding power supply element 121.

Structure of Antenna Module

Figure 2:
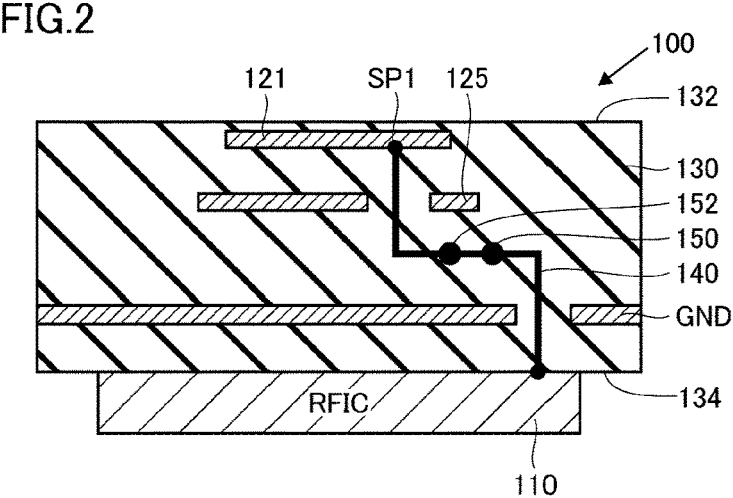
FIG. 2 is a cross-sectional view of an antenna module according to an embodiment.

The structure of the antenna module 100 will be described with reference to FIGS. 2 and 3. FIG. 2 is a cross-sectional view of the antenna module 100. Referring to FIG. 2, the antenna module 100 includes, in addition to the power supply element 121 and the RFIC 110, a dielectric substrate 130, a ground electrode GND, a parasitic element 125, and a power supply wiring line 140. In FIG. 2, a case in which only one power supply element 121 is disposed will be described for ease of description, but a configuration in which the plurality of power supply elements 121 is disposed may be employed. In the following description, the power supply element 121 and the parasitic element 125 are also collectively referred to as a "radiation element".

Figure 3:
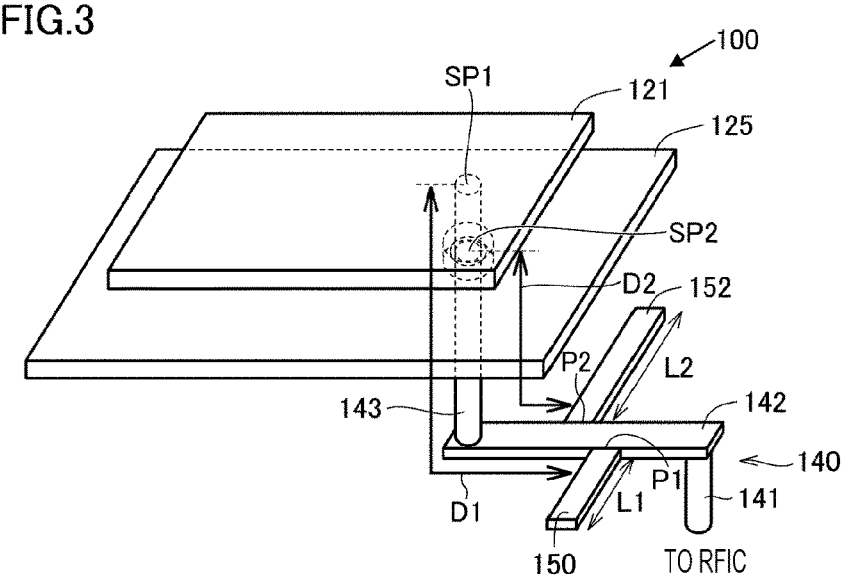
FIG. 3 is a perspective view illustrating a portion of a radiation element and a power supply wiring line of the antenna module in FIG. 2.

FIG. 3 is a perspective view for explaining positions of the radiation elements and the power supply wiring line 140. In FIG. 3, for facilitating the understanding, only constituent elements including the power supply element 121, the parasitic element 125, the power supply wiring line 140, and stubs 150 and 152, which will be explained later, are described, and the description of the dielectric substrate 130 and the RFIC 110 is omitted. In the following description, a configuration including the radiation elements (the power supply element 121 and the parasitic element 125), the power supply wiring line 140, and the stubs 150 and 152 illustrated in FIG. 3 will also be referred to as an "antenna".

The dielectric substrate 130 is, for example, a substrate in which resin, such as epoxy or polyimide is formed in a multilayer structure. The dielectric substrate 130 may be formed by using a liquid crystal polymer (LCP) having a lower dielectric constant or a fluorine-based resin.

The power supply element 121 is disposed on a first surface 132 of the dielectric substrate 130 or in an inner layer of the dielectric substrate 130. The RFIC 110 is mounted on a second surface (mounting surface) 134 on a side opposite to the first surface 132 of the dielectric substrate 130 via a connection electrode, such as a solder bump (not illustrated). The ground electrode GND is disposed between the layer where the power supply element 121 is disposed and the second surface 134 in the dielectric substrate 130.

The parasitic element 125 is disposed in a layer between the power supply element 121 and the ground electrode GND of the dielectric substrate 130 in such a manner as to face the power supply element 121. The size of the parasitic element 125 (the area of a radiation surface) is larger than the size of the power supply element 121, and the overall power supply element 121 is so disposed as to overlap with the parasitic element 125 when the antenna module 100 is seen in a plan view from the normal direction of the first surface 132 of the dielectric substrate 130.

Resonant frequencies of the power supply element 121 and the parasitic element 125 are generally determined by the size of each element. In general, as the element size is large, the resonant frequency tends to be lower, while as the element size is smaller, the resonant frequency tends to be higher. The size of the power supply element 121 and the size of the parasitic element 125 are determined in accordance with the frequency of a radio frequency signal to be transmitted by the antenna module.

The power supply wiring line 140 extends from the RFIC 110 and passes through the ground electrode GND and the parasitic element 125, so as to be connected to the power supply element 121. More specifically, as illustrated in FIG. 3, the power supply wiring line 140 extends upward from the RFIC 110 to a layer between the ground electrode GND and the parasitic element 125 by a via 141, is offset by a wiring pattern 142 to a position under the parasitic element 125 in the layer, and further extends upward therefrom to a power supply point SP1 of the power supply element 121 while passing through the parasitic element 125 by a via 143. The power supply wiring line 140 supplies the radio frequency power from the RFIC 110 to the power supply element 121. As described above, the power supply wiring line 140 having reached the layer between the ground electrode GND and the parasitic element 125 bends to extend in a direction toward the center of the power supply element 121, and further bends at the position immediately under the power supply point SP1 of the power supply element 121 to extend in a direction toward the first surface 132 of the dielectric substrate 130, so as to connect to the power supply element 121 while passing through the parasitic element 125.

The stubs 150 and 152 are connected to the power supply wiring line 140 at different positions thereof. The stub 150 and the stub 152 extend in opposite directions to each other with the wiring pattern 142 of the power supply wiring line 140 interposed therebetween.

The stubs 150 and 152 are provided to adjust the impedance at resonant frequencies of the power supply element 121 and the parasitic element 125, respectively. Therefore, a line length L1 of the stub 150 is determined in accordance with the wave length of the radio frequency signal radiated from the power supply element 121, and a line length L2 of the stub 152 is determined in accordance with the wave length of the radio frequency signal radiated from the parasitic element 125. Each of the stubs 150 and 152 also has a function, along with the above-described impedance adjustment function, as a band pass filter configured to allow a signal in a frequency band wider than a target frequency band to pass therethrough. Therefore, the line length L1 of the stub 150 corresponding to the power supply element 121 configured to radiate a signal on a relatively high frequency side is set to a dimension longer than a quarter of a wave length $\lambda 1$ of the radio frequency signal radiated from the power supply element 121. On the other hand, the line length L2 of the stub 152 corresponding to the parasitic element 125 configured to radiate a signal on a relatively low frequency side is set to a dimension shorter than a quarter of a wave length $\lambda 2$ of the radio frequency signal radiated from the parasitic element 125. Each of the stubs 150 and 152 may not be formed with a constant line width, and the line width may be changed midway in the stub.

The stub 150 is connected to the power supply wiring line 140 at a position P1 (first position) corresponding to a frequency f1 of the radio frequency signal radiated from the power supply element 121. The stub 152 is connected to the power supply wiring line 140 at a position P2 (second position) corresponding to the frequency of the radio frequency signal radiated from the parasitic element 125. More specifically, a distance D1 from a connection position between the power supply element 121 and the power supply wiring line 140 (that is, the power supply point SP1) to the connection position P1 of the stub 150 along the power supply wiring line 140 is determined in accordance with the frequency f1 of the radio frequency signal radiated from the power supply element 121. A distance D2 from a position (SP2), at which the power supply wiring line 140 passes through the parasitic element 125, to the connection position P2 of the stub 152 along the power supply wiring line 140 is determined in accordance with a frequency f2 of the radio frequency signal radiated from the parasitic element 125. For example, the distance D1 is one third of the wave length λ1 of the radio frequency signal, and the distance D2 is one thirtieth of the wave length λ2 of the radio frequency signal.

As described above, in the antenna module 100 according to the present embodiment, the stubs respectively corresponding to the power supply element 121 and the parasitic element 125 are provided at the positions on the power supply wiring line 140 corresponding to the radio frequency signals radiated from the respective elements. By doing so, it is possible to individually adjust the impedance for each frequency band of the elements.

In the antenna module 100 illustrated in FIG. 2, an example in which the stubs 150 and 152 are formed in the layer between the parasitic element 125 and the ground electrode GND is described. However, the layer in which the stubs are formed in a layer between the ground electrode GND and the RFIC 110 as in the antenna module 100 #illustrated in FIG. 4.

Modification 1

In the above-described embodiment, an example of the configuration has been described in which a radio frequency signal of one polarized wave is radiated from each of the power supply element 121 and the parasitic element 125.

In Modification 1, an example in which radio frequency signals radiated from each element are two polarized waves will be described.

Figure 4:
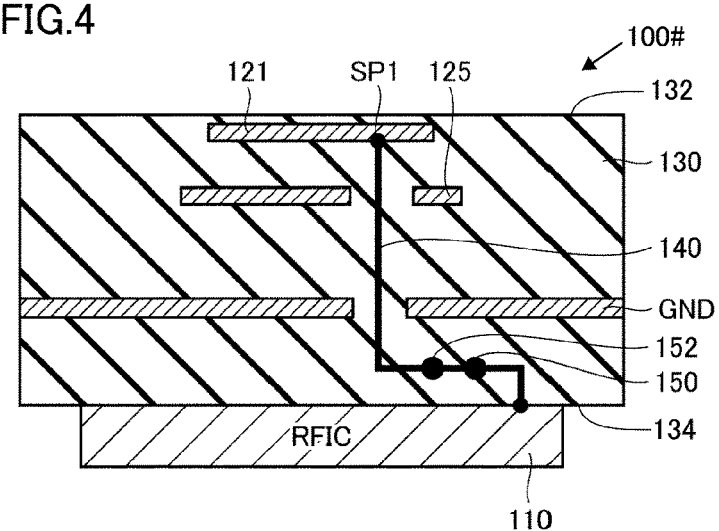
FIG. 4 is a diagram illustrating another example of a cross-sectional view of an antenna module according to an embodiment.
Figure 5:
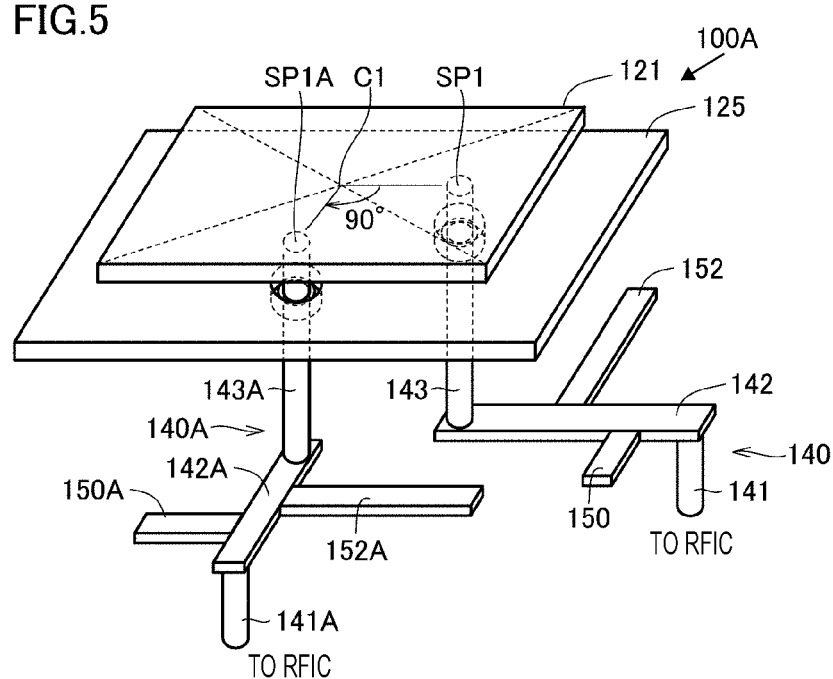
FIG. 5 is a perspective view illustrating a portion of a radiation element and a power supply wiring line of an antenna module according to Modification 1.

FIG. 5 is a perspective view illustrating a portion of a radiation element and a power supply wiring line of an antenna module 100A according to Modification 1. The antenna module 100A of FIG. 5 includes, in addition to the power supply wiring line 140 in FIG. 4, a power supply wiring line 140A configured to supply a radio frequency signal of another polarized wave.

Similarly to the power supply wiring line 140, the power supply wiring line 140A extends upward from the RFIC 110 to a layer between the ground electrode GND and the parasitic element 125 by a via 141A, is offset by a wiring pattern 142A to a position under the parasitic element 125 in the layer, and further extends upward therefrom to a power supply point SP1A of the power supply element 121 while passing through the parasitic element 125 by a via 143A.

The power supply point SP1A is disposed at a position where the power supply point SP1 is rotated by 90 degrees with respect to an intersection point C1 of the diagonal lines of the power supply element 121.

Stubs 150A and 152A are connected to the power supply wiring line 140A at different positions thereof. The stub 150A and the stub 152A extend in opposite directions to each other with the wiring pattern 142A of the power supply wiring line 140A interposed therebetween. The line length of the stub 150A and the connection position thereof in the power supply wiring line 140A are determined in accordance with the frequency f1 and the wave length λ1 of the radio frequency signal radiated from the power supply element 121. The line length of the stub 152A and the connection position thereof in the power supply wiring line 140A are determined in accordance with the frequency f2 and the wave length λ2 of the radio frequency signal radiated from the parasitic element 125.

As described above, as for the antenna module of the two-polarized-wave type as well, in each of the power supply wiring lines, the stubs respectively corresponding to the power supply element and the parasitic element are provided at the positions corresponding to the radio frequency signals to be radiated. By doing so, it is possible to individually adjust the impedance for each frequency band of the elements, with respect to each polarized wave of the radio frequency signals.

Modification 2

In Modification 1, an example has been described in which the stubs connected to each power supply wiring line are an open stub where an end portion on the opposite side to an end portion connected to the power supply wiring line is open.

In Modification 2, an example in which stubs connected to each power supply wiring line are a short stub will be described.

Figure 6:
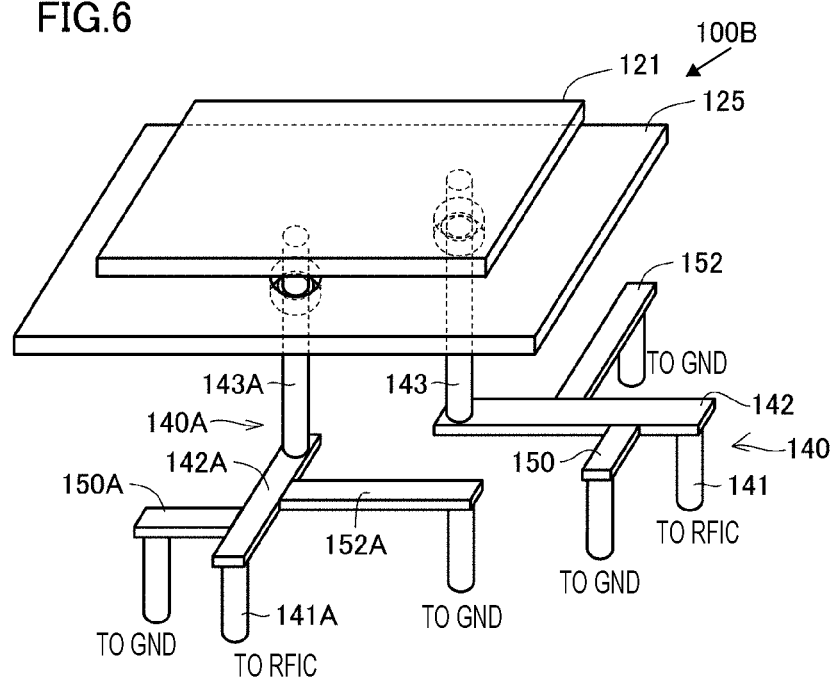
FIG. 6 is a perspective view illustrating a portion of a radiation element and a power supply wiring line of an antenna module according to Modification 2.

FIG. 6 is a perspective view illustrating a portion of a radiation element and a power supply wiring line of an antenna module 100B according to Modification 2. In the antenna module 100B of FIG. 6, in each stub connected to the power supply wiring line 140 or 140A, an end portion of the stub on the opposite side to an end portion thereof connected to the power supply wiring line is connected to the ground electrode GND by a via. As a result, each stub serves as a short stub.

As described above, when the stubs connected to the power supply wiring line are set as short stubs, static electricity charged in the antenna flows to the ground electrode GND. Thus, an electronic device, such as an RFIC, connected to the power supply wiring line may be protected from electrostatic discharge (ESD) caused by the stub.

The antenna module 100B in FIG. 6 has a configuration in which each stub is a short stub in the case of two polarized waves, but a short stub may also be used for the one-polarized-wave type antenna module as illustrated in FIG. 2 or 4.

Antenna Arrangement in Antenna Array

As described in FIG. 1, in the antenna module, the antenna array 120 in which a plurality of antennas is two-dimensionally arranged is formed.

As described above, when the stubs are formed on the wiring pattern of the power supply wiring line, the power supply wiring line is so formed as to protrude to an outer side portion relative to the radiation elements (the power supply element 121 and the parasitic element 125) of the antenna.

As a result, the power supply wiring lines are formed between the antennas adjacent to each other, and when the antenna array 120 is seen in a plan view, the power supply wiring line and/or the stub of one of the antennas overlaps with the power supply wiring line and/or the stub of the other one of the antennas in some case.

When the power supply wiring lines and/or the stubs of the adjacent antennas overlap with each other as described above, there arises a risk that mutual electromagnetic coupling occurs and causes noise or the like.

In particular, in the two-polarized-wave type antennas as described in Modifications 1 and 2, there are included two power supply wiring lines and four stubs. Accordingly, the overlapping of the power supply wiring lines and the stubs is likely to occur unless the antennas are appropriately arranged.

In FIGS. 7 to 10 given below, arrangement examples in which power supply wiring lines and stubs of adjacent antennas do not overlap with each other will be described while exemplifying a case of an antenna array that includes eight two-polarized-wave type antennas in the form of two by four. For ease of description, in each of the drawings of FIGS. 7 to 10, antennas on the upper stage are denoted by reference signs, such as 160-11, 160-12, 160-13, and 160-14 from the left, while antennas on the lower stage are denoted by reference signs, such as 160-21, 160-22, 160-23, and 160-24 from the left.

Arrangement Example 1

Figure 7:
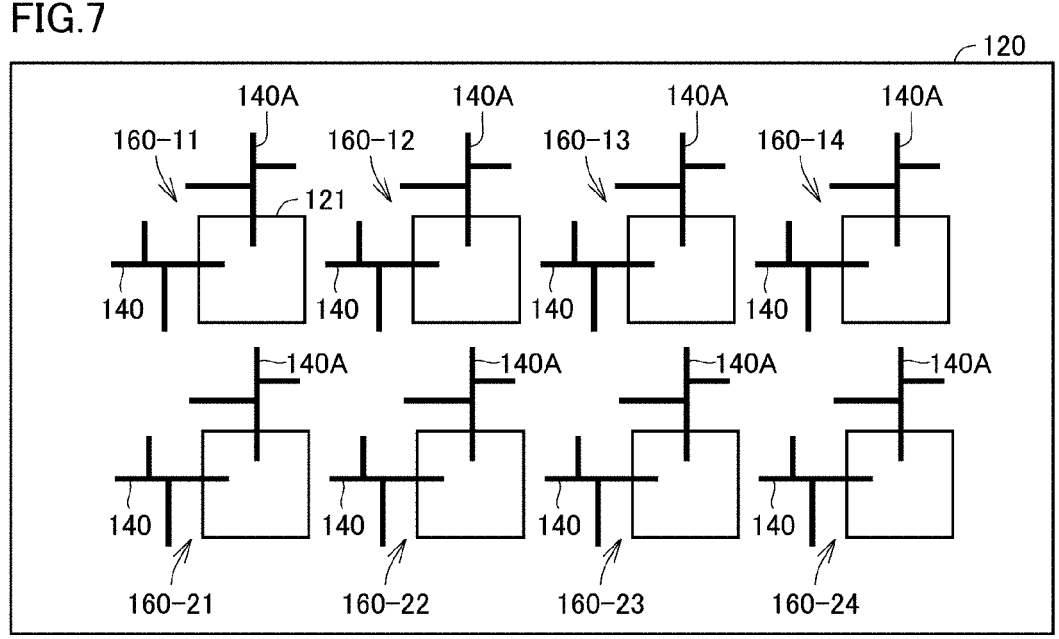
FIG. 7 is a diagram illustrating a first arrangement example of antennas in an antenna array.
Figure 7:
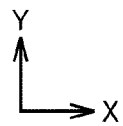

FIG. 7 is a diagram illustrating an arrangement example of antennas 160 in an antenna array 120. In each antenna 160 in FIG. 7, two power supply wiring lines 140 and 140A are formed to extend in directions orthogonal to each other as illustrated in FIG. 5. As a result, all the antennas 160 are arranged facing the same direction. More specifically, the power supply wiring line 140 is formed to extend in the negative direction of an X-axis from the power supply element 121, and the power supply wiring line 140A is formed to extend in the positive direction of a Y-axis from the power supply element 121.

In this arrangement example, between two antennas adjacent to each other in the X-axis direction, only the power supply wiring line 140 of one of the adjacent antennas is formed. Between two antennas adjacent to each other in the Y-axis direction, only the power supply wiring line 140A of one of the adjacent antennas is formed. Accordingly, when the antenna array 120 is seen in a plan view, between two antennas adjacent to each other, none of the power supply wiring lines and the stubs thereof overlap each other.

Arrangement Example 2

Figure 8:
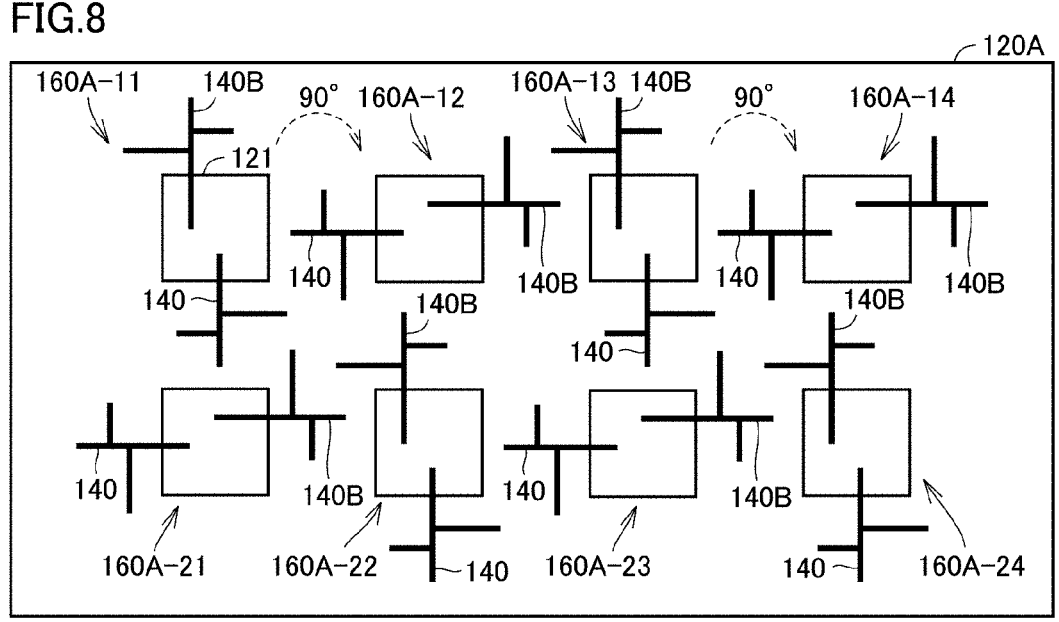
FIG. 8 is a diagram illustrating a second arrangement example of antennas in an antenna array.
Figure 8:
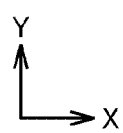

FIG. 8 is a diagram illustrating an arrangement example of antennas 160A in an antenna array 120A. In each antenna 160A in FIG. 8, two power supply wiring lines 140 and 140B are formed to extend in opposite directions to each other. More specifically, in each of the antennas 160A-11, 13, 22, and 24, the power supply wiring line 140 is formed to extend in the negative direction of the Y-axis from the power supply element 121, and the power supply wiring line 140B is formed to extend in the positive direction of the Y-axis from the power supply element 121.

On the other hand, the arrangement of each of the antennas 160A-12, 14, 21, and 23 is such that the arrangement of each of the antennas 160A-11, 13, 22, and 24 is rotated by 90 degrees, and the power supply wiring line 140 is formed to extend in the negative direction of the X axis from the power supply element 121 while the power supply wiring line 140B is formed to extend in the positive direction of the X axis from the power supply element 121.

In this arrangement example, between two antennas adjacent to each other in the X-axis direction and between two antennas adjacent to each other in the Y-axis direction, only the power supply wiring line 140 or 140B of one of the adjacent antennas is formed. Accordingly, when the antenna array 120A is seen in a plan view, between two antennas adjacent to each other, none of the power supply wiring lines and the stubs thereof overlap each other.

Arrangement Example 3

FIG. 9 is a diagram illustrating an arrangement example of antennas 160B in an antenna array 120B. In the antenna array 120B in FIG. 9, the antennas 160B are arranged line-symmetrically with respect to a line LN, which is parallel to the Y-axis and passes through between two antennas (for example, the antenna 160B-12 and the antenna 160B-13) arranged in a central portion of the antennas 160B aligned in the X-axis direction.

More specifically, similarly to FIG. 7, in each of the antennas 160B-11, 12, 21, and 22, the power supply wiring line 140 is formed to extend in the negative direction of the X-axis from the power supply element 121, and the power supply wiring line 140A is formed to extend in the positive direction of the Y-axis from the power supply element 121.

On the other hand, in each of the antennas 160B-13, 14, 23, and 24, the power supply wiring line 140 is formed to extend in the positive direction of the X-axis from the power supply element 121, and the power supply wiring line 140A is formed to extend in the positive direction of the Y-axis from the power supply element 121.

In this arrangement example, except for an area between two antennas in the central portion (between the antenna 160B-12 and the antenna 160B-13 and between the antenna 160B-22 and the antenna 160B-23), between two antennas adjacent to each other in the X-axis direction, only the power supply wiring line 140 of one of the adjacent antennas is formed, and between two antennas adjacent to each other in the Y-axis direction, only the power supply wiring line 140A of one of the adjacent antennas is formed. Accordingly, when the antenna array 120B is seen in a plan view, between two antennas adjacent to each other, none of the power supply wiring lines and the stubs thereof overlap each other.

By line-symmetrically arranging the antennas in the antenna array as in Arrangement Example 3 described above, it is possible to cause the radiated polarized waves to have symmetric characteristics.

Alternatively or additionally, the upper-stage antennas and the lower-stage antennas may be arranged line-symmetrically with respect to a line parallel to the X-axis.

Arrangement Example 4

FIG. 10 is a diagram illustrating an arrangement example of antennas 160C in an antenna array 120C. In the antenna array 120C in FIG. 10, the antennas 160C are arranged in such a manner that two adjacent antennas aligned in the X-axis direction are rotated by 90 degrees relative to each other.

More specifically, in each of the antennas 160C-11 and 21, the power supply wiring line 140 is formed to extend in the negative direction of the Y-axis from the power supply element 121, and the power supply wiring line 140A is formed to extend in the negative direction of the X-axis from the power supply element 121. In each of the antennas 160C-12 and 22, the power supply wiring line 140 is formed to extend in the negative direction of the X-axis from the power supply element 121, and the power supply wiring line 140A is formed to extend in the positive direction of the Y-axis from the power supply element 121.

In each of the antennas 160C-13 and 23, the power supply wiring line 140 is formed to extend in the positive direction of the Y-axis from the power supply element 121, and the power supply wiring line 140A is formed to extend in the positive direction of the X-axis from the power supply element 121. In each of the antennas 160C-14 and 24, the power supply wiring line 140 is formed to extend in the positive direction of the X-axis from the power supply element 121, and the power supply wiring line 140A is formed to extend in the negative direction of the Y-axis from the power supply element 121.

In this arrangement example as well, between two antennas adjacent to each other in the X-axis direction and between two antennas adjacent to each other in the Y-axis direction, at most only one of the power supply wiring lines of one of the adjacent antennas is formed. Accordingly, when the antenna array 120C is seen in a plan view, between two antennas adjacent to each other, none of the power supply wiring lines and the stubs thereof overlap each other.

The arrangement examples illustrated in FIGS. 7 to 10 are merely examples, and other arrangements may also be employed in which power supply wiring lines and stubs do not overlap with each other between adjacent antennas. Further, the number of antennas to be aligned and the formation positions of the power supply wiring lines in each antenna may be different from those described above.

In the antenna module, the number of ground electrodes may not be limited to one; for example, another ground electrode disposed in a layer closer to the stub may be disposed only at a position overlapping with the stub. According to this configuration, since it is possible to reduce the line width of the stub, the overall antenna module may be reduced in size. Furthermore, according to this configuration, since the coupling amount between the stub and the ground electrode can be adjusted, when the stub functions as a band pass filter, it is possible to adjust the characteristics of the band pass filter.

In the above description, an example of a case where the number of parasitic elements through which the power supply wiring line passes is one has been discussed. However, the number of parasitic elements is not limited thereto, and a configuration in which two or more parasitic elements are disposed may also be employed. Note that, as in the above-described embodiment, in the case where the radio frequency signals of different frequency bands are radiated from the power supply element and the parasitic element by using the respective power supply wiring lines, it is desirable that the number of parasitic elements through which the power supply wiring lines pass is one.

It is to be considered that the embodiment disclosed herein is illustrative in all respects and is not restrictive. The scope of the present disclosure is indicated by the claims rather than the description of the above-described embodiment, and it is intended to include all modifications within the meaning and scope equivalent to the claims.

REFERENCE SIGNS LIST

10 COMMUNICATION APPARATUS
100, 100A, 100B ANTENNA MODULE
111A to 111D, 113A to 113D, 117 SWITCH
112AR to 112DR LOW-NOISE AMPLIFIER
112AT to 112DT POWER AMPLIFIER
114A to 114D ATTENUATOR
115A to 115D PHASE SHIFTER
116 SIGNAL SYNTHESIZER/DEMULTIPLEXER
118 MIXER
119 AMPLIFICATION CIRCUIT
120, 120A to 120C ANTENNA ARRAY
121 POWER SUPPLY ELEMENT
125 PARASITIC ELEMENT
130 DIELECTRIC SUBSTRATE
132, 134 SURFACE
140, 140A, 140B POWER SUPPLY WIRING LINE
141, 141A, 143, 143A VIA
142, 142A WIRING PATTERN
150, 150A, 152, 152A STUB
160, 160A to 160C ANTENNA GND GROUND ELECTRODE
SP1A, SP1 POWER SUPPLY POINT

The invention claimed is:

1. An antenna comprising:
a parasitic circuit element in a dielectric substrate;
a first wiring line that passes through the parasitic circuit element; and
a first stub and a second stub that are connected to the first wiring line,
wherein the first stub is connected to a different position of the first wiring line than the second stub, and
wherein the first stub is connected to the first wiring line at a first position corresponding to a first frequency of a radio frequency signal radiated at a power supply circuit element supplied by the first wiring line.

2. The antenna according to claim 1, wherein a distance from the first position to a connection of the power supply circuit element and the first wiring line along the first wiring line is based on the first frequency.

3. The antenna according to claim 1, wherein each of the first stub and the second stub is an open stub.

4. The antenna according to claim 1, wherein each of the first stub and the second stub is a short stub in which a first end portion is grounded and is on an opposite side to a second end portion that is connected to the first wiring line.

5. An antenna module comprising:
a plurality of antennas according to claim 1, wherein, when the antenna module is seen in a plan view, the first wiring line and the stubs of each of the plurality of antennas do not overlap the first wiring lines and the stubs of other antennas.

6. An antenna comprising:
a parasitic circuit element in a dielectric substrate;
a first wiring line that passes through the parasitic circuit element; and
a first stub and a second stub that are connected to the first wiring line,
wherein the first stub is connected to a different position of the first wiring line than the second stub, and
wherein the second stub is connected to the first wiring line at a second position corresponding to a second frequency of a radio frequency signal radiated at the parasitic circuit element.

7. The antenna according to claim 6, wherein a distance from the second position to a position where the first wiring line passes through the parasitic circuit element along the first wiring line is based on the second frequency.

8. An antenna comprising:
a parasitic circuit element in a dielectric substrate;

a first wiring line that passes through the parasitic circuit element; and a first stub and a second stub that are connected to the first wiring line, wherein the first stub is connected to a different position of the first wiring line than the second stub, and wherein the first stub has a line length corresponding to a wavelength of a radio frequency signal radiated at a power supply circuit element supplied by the first wiring line.

9. An antenna comprising:

a parasitic circuit element in a dielectric substrate;

a first wiring line that passes through the parasitic circuit element; and a first stub and a second stub that are connected to the first wiring line, wherein the first stub is connected to a different position of the first wiring line than the second stub, and wherein the second stub has a line length corresponding to a wavelength of a radio frequency signal radiated at the parasitic circuit element.

10. An antenna comprising:

a parasitic circuit element in a dielectric substrate;

a first wiring line that passes through the parasitic circuit element; and a first stub and a second stub that are connected to the first wiring line, wherein the first stub is connected to a different position of the first wiring line than the second stub, and wherein the first stub and the second stub are in a layer of the dielectric substrate that is between the parasitic circuit element and a ground electrode.

11. An antenna comprising:

a parasitic circuit element in a dielectric substrate;

a first wiring line that passes through the parasitic circuit element; and a first stub and a second stub that are connected to the first wiring line, wherein the first stub is connected to a different position of the first wiring line than the second stub, and wherein the first stub and the second stub are in a layer of the dielectric substrate that is between a mounting surface of the dielectric substrate and a ground electrode.

12. An antenna comprising:

a parasitic circuit element in a dielectric substrate;

a first wiring line that passes through the parasitic circuit element;

a first stub and a second stub that are connected to the first wiring line, a second wiring line that passes through the parasitic circuit element; and a third stub and a fourth stub that are connected to the second wiring line, wherein the first stub is connected to a different position of the first wiring line than the second stub, and wherein the third stub is connected to a different position of the second wiring line than the fourth stub.

13. An antenna module comprising:

a plurality of antennas according to claim 12, wherein only one of the first wiring line and the second wiring line is between a first of the plurality of antennas and a second of the plurality of antennas.

14. The antenna module according to claim 13, wherein, when the antenna module is seen in a plan view from a normal direction of the dielectric substrate, the first antenna is located symmetrically with respect to the second antenna.

15. The antenna module according to claim 13, wherein, when the antenna module is seen in a plan view from a normal direction of the dielectric substrate, the second antenna is adjacent to the first antenna and is rotated relative to the first antenna by 90 degrees.

16. A communication apparatus comprising:

the antenna according to claim 1.

17. A communication apparatus comprising:

the antenna module according to claim 13.

18. A communication apparatus comprising:

the antenna module according to claim 5.

* * * * *